United States Patent
Mildh et al.

(10) Patent No.: US 11,632,670 B2
(45) Date of Patent: *Apr. 18, 2023

(54) METHOD AND ARRANGEMENT IN A TELECOMMUNICATION SYSTEM

(71) Applicant: Telefonaktiebolaget LM Ericsson (publ), Stockholm (SE)

(72) Inventors: Gunnar Mildh, Sollentuna (SE); Ingrid Nordstrand, Sundbyberg (SE); András Rácz, Budapest (HU); Magnus Stattin, Sollentuna (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/225,620

(22) Filed: Apr. 8, 2021

(65) Prior Publication Data

US 2021/0227377 A1 Jul. 22, 2021

Related U.S. Application Data

(63) Continuation of application No. 16/148,237, filed on Oct. 1, 2018, now Pat. No. 11,006,267, which is a
(Continued)

(51) Int. Cl.
*H04L 12/26* (2006.01)
*H04W 8/22* (2009.01)
(Continued)

(52) U.S. Cl.
CPC ............ *H04W 8/22* (2013.01); *H04W 8/08* (2013.01); *H04W 12/037* (2021.01); *H04W 12/10* (2013.01); *H04L 63/20* (2013.01)

(58) Field of Classification Search
None
See application file for complete search history.

(56) References Cited

U.S. PATENT DOCUMENTS

| 5,912,946 A | 6/1999 | Michelson |
| 6,493,631 B1 | 12/2002 | Burns |

(Continued)

FOREIGN PATENT DOCUMENTS

| CN | 1867181 A | 11/2006 |
| CN | 101002497 A | 7/2007 |

(Continued)

OTHER PUBLICATIONS

Nevdyaev, L.M, "Telecommunication technologies", English-Russian Glossary-Handbook, Publication series "Communication & Business", Moscow, 2002, 1 page.
(Continued)

*Primary Examiner* — Zewdu A Beyen
(74) *Attorney, Agent, or Firm* — Murphy, Bilak & Homiller, PLLC

(57) ABSTRACT

Handling of UE capability information in a mobile telecommunications network wherein an eNodeB receives information regarding the UE capability information from the UE and stores the information. The eNodeB sends the UE capability information to the EPC, i.e., to an MME, which receives and stores the UE capability information. When the UE transits from idle to active state, does an initial attach, or when a part of the UE capabilities have changed, it sends a message to the eNodeB regarding the update. The eNodeB forwards the message to the MME, which sends a response associated with the previously stored UE capability information to the eNodeB. The eNodeB decides whether the UE capabilities stored in the MME is up-to-date based on the message from the UE and the response from the MME. If the
(Continued)

UE holds updated UE capabilities the eNodeB can request updated UE capability information from the UE.

18 Claims, 6 Drawing Sheets

Related U.S. Application Data continuation of application No. 15/808,992, filed on Nov. 10, 2017, now Pat. No. 10,091,642, which is a continuation of application No. 14/183,656, filed on Feb. 19, 2014, now Pat. No. 9,843,921, which is a continuation of application No. 12/745,830, filed as application No. PCT/SE2008/050575 on May 15, 2008, now Pat. No. 8,699,997.

(60) Provisional application No. 60/992,795, filed on Dec. 6, 2007.

(51) Int. Cl.
*H04W 12/10* (2021.01)
*H04W 12/037* (2021.01)
*H04W 8/08* (2009.01)
*H04L 9/40* (2022.01)

(56) References Cited

U.S. PATENT DOCUMENTS

| | | | |
|---|---|---|---|
| 7,133,462 | B2 | 11/2006 | Ha et al. |
| 2,007,025 | A1 | 11/2007 | Shaheen et al. |
| 8,199,727 | B1 * | 6/2012 | Bienn .......... H04L 65/1069 370/335 |
| 8,699,997 | B2 | 4/2014 | Rácz et al. |
| 10,091,642 | B2 | 10/2018 | Mildh et al. |
| 2002/0103610 | A1 | 8/2002 | Bachmann et al. |
| 2006/0019647 | A1 | 1/2006 | Muhonen et al. |
| 2006/0020636 | A1 | 1/2006 | Murotani |
| 2006/0160555 | A1 | 7/2006 | Kobayashi et al. |
| 2006/0236083 | A1 | 10/2006 | Fritsch et al. |
| 2006/0264217 | A1 | 11/2006 | Shaheen |
| 2007/0002840 | A1 | 1/2007 | Song et al. |
| 2007/0150542 | A1 | 6/2007 | Sommerer |
| 2007/0224990 | A1 | 9/2007 | Edge et al. |
| 2007/0258427 | A1 | 11/2007 | Shaheen et al. |
| 2008/0118066 | A1 | 5/2008 | Jiang |
| 2008/0181149 | A1 | 7/2008 | Jiang |
| 2008/0299911 | A1 | 12/2008 | Chen et al. |
| 2009/0025060 | A1 | 1/2009 | Mukherjee et al. |

FOREIGN PATENT DOCUMENTS

| | | |
|---|---|---|
| CN | 101079666 A | 11/2007 |
| CN | 101272621 A | 9/2008 |
| EP | 1056301 A2 | 11/2000 |
| JP | 2000216946 A | 8/2000 |
| JP | 2004158947 A | 6/2004 |
| JP | 2006054856 A | 2/2006 |
| JP | 2006180139 A | 7/2006 |
| JP | 2006216946 A | 8/2006 |
| JP | 2008507228 A | 3/2008 |
| JP | 2009530994 A | 8/2009 |
| RU | 2255428 C2 | 6/2005 |
| WO | 9826625 A2 | 6/1998 |
| WO | 2005050416 A1 | 6/2005 |
| WO | 2006124840 A1 | 11/2006 |
| WO | 2006137646 A1 | 12/2006 |
| WO | 2007109695 A1 | 9/2007 |

OTHER PUBLICATIONS

Unknown, Author, "Change of UE capability during an RRC connection", Qualcomm Europe et al., Change Request, 3GPP TSG-RAN WG2 Meeting #60, R2-075328, Jeju, Korea, Nov. 5-9, 2007, pp. 1-43.

Unknown, Author, "Handling of UE capability information in SAE/LTE", Ericsson, 3GPP TSG-RAN WG2 #57-bis, R2-071328, St. Julian, Malta, Mar. 26-30, 2007, pp. 1-4.

Unknown, Author, "Signaling Method for Uploading UE Capability Information", Ericsson, 3GPP TSG-RAN WG2 #58, R2-071819, Kobe, Japan, May 7-11, 2007, pp. 1-4.

Unknown, Author, "The procedure in S1AP for UE Radio Capability transferring", NEC, RAN Working Group 3 meeting #59bis, R3-080726, Shenzhen, China, Mar. 31-Apr. 3, 2008, pp. 1-3.

Unknown, Author, "UE Capability Transfer", 3GPP TSG-RAN WG2 Ad Hoc on LTE RRC, Tdoc R2-075515, Vienna, Austria, Dec. 13-14, 2007, pp. 1-7.

* cited by examiner

METHOD AND ARRANGEMENT IN A TELECOMMUNICATION SYSTEM

TECHNICAL FIELD

The present disclosure relates to methods and arrangements in a telecommunication system, in particular to signaling of radio network related terminal capabilities.

BACKGROUND

UTRAN (Universal terrestrial radio access network) is the radio access network of a UMTS, wherein the UTRAN consists of Radio Network Controllers (RNCs) and Node Bs (i.e. radio base stations). The NodeBs communicate wirelessly with mobile terminals and the RNCs control the Node Bs. The RNCs are further connected to the Core Network (CN). Evolved UTRAN (E-UTRAN) is the evolution of the UTRAN towards a high-data rate, low-latency, and packet-optimised radio access network. Further, E-UTRAN consists of interconnected eNodeBs (evolved Node Bs) that are further connected to the Evolved Packet Core network (EPC). E-UTRAN is also being referred to as Long Term Evolution (LTE) and standardized within the $3^{rd}$ Generation Partnership Project (3GPP).

To allow for a wide range of user equipment (UE) implementations, different UE capabilities are specified. The UE capabilities are divided into a number of parameters, which are sent from the UE at the establishment of a connection and if/when the UE capabilities are changed during an ongoing connection. The UE capabilities may then be used by the network to select a configuration that is supported by the UE.

In 3GPP standardization of E-UTRAN radio access it has been agreed to transfer the UE radio network related capability information i.e. the UE capabilities using RRC (Radio Resource Control) signaling from the UE to the eNodeB. In order to avoid uploading the UE capabilities over the radio interface between the UE and the eNodeB each time the UE performs a transition to active state (i.e. when the UE specific context is created in the eNB) it has been agreed that the eNodeB should upload the capabilities to the EPC so that they can be stored there when the UE is in idle state. When the UE returns to active state the UE capabilities should be downloaded to the eNB. Before the UE can use the services of the network in its full extent it has to exhibit its capabilities (e.g. supported bit rates, antenna configurations, bandwidths, supported access types, etc.) to the EPC. When the EPC has knowledge of the UE capabilities the EPC can tailor transmissions in conjunction with services to said UE according to its capabilities.

Generally, UE capabilities can be classified into mainly two sets of capability categories depending on which layer of the protocol hierarchy the given capability information is related to:

Access Stratum (AS) capabilities: these are the access technology dependent parts of the capability information such as terminal power class, supported frequency band etc. The AS capabilities are needed by the eNodeB.

Non Access Stratum (NAS) capabilities: this set of capability information holds the non access specific parts of the UE capability such as supported security algorithms. The NAS capabilities are used by the EPC.

Information on the AS part of the UE capabilities needs to be present in the eNodeB in the active state of the UE. Moreover, when a handover is made from a first eNodeB to a second eNodeB the UE capability information needs to be moved from the first eNodeB to the second eNodeB. However, for a UE in the idle state there is no need to maintain any UE information, including the UE capabilities, in the eNodeBs but only in the EPC. Thus, when a UE transits to active state again, the information of the UE, including the UE capabilities, must be recreated in the eNodeB.

SUMMARY

It is therefore an object of the present invention to maintain the UE capability information both in E-UTRAN, i.e. the eNodeBs, and EPC.

UE capability information is handled in the network wherein an eNodeB receives information regarding the UE capability information from the UE and stores the information. The eNodeB then sends this UE capability information to the EPC, i.e. the MME, which receives and stores the information. When a UE sends a message to the eNodeB, which receives and forwards it to the MME, the MME sends a response associated with the previously stored UE capability information to the eNodeB. The eNodeB can then decide whether the UE capabilities stored in the MME is up-to-date based on the message sent from the UE and the received response from the MME. In case the UE holds updated UE capabilities the eNodeB can request updated UE capability information from the UE.

According to a first aspect of embodiments of the present invention, a method for a core network node is provided. In said method a first message comprising UE capability information of the UE is received. The received UE capability information is stored. A second message comprising information indicative of the UE capabilities is received. In response to the second message a third message associated with UE capability information is sent to the eNodeB.

According to a second aspect of embodiments of the present invention, a method for an eNodeB is provided. In said method a first message comprising UE capability information of the UE is received and stored. A second message comprising UE capability information of the UE is sent. Further a third message comprising information indicative of the UE capabilities from the UE is received and sent. In response to the third message a fourth message associated with UE capability information is received from the core network node.

According to a third aspect of embodiments of the present invention, a method for a user equipment is provided. In said method a first message comprising UE capability information of the UE is sent. Further, a second message comprising information indicative of the UE capabilities is sent.

According to a further aspect of embodiments of the present invention, a core network node for handling user equipment capability information is provided. The core network node comprises means for receiving a first message comprising UE capability information of the UE and means for storing the received UE capability information. Further, the core network mode comprises means for receiving a second message comprising information indicative of the UE capabilities, and means for sending in response to the second message a third message associated with UE capability information to the eNodeB.

According to yet a further aspect of the present invention, an eNodeB for handling user equipment capability information is provided. The eNodeB comprises means for receiving a first message comprising UE capability information of the UE and means for storing the UE capability information. Further the eNodeB comprises means for sending a second message comprising UE capability information of the UE. It also comprises means for receiving a third message comprising information indicative of the UE capabilities from the UE and means for sending the third message indicative of the UE capabilities. Further, the eNodeB comprises means for receiving in response to the third message a fourth message associated with UE capability information from the core network node.

According to still a further aspect of embodiments of the present invention, a user equipment for handling UE capability information is provided. The user equipment comprises means for sending a first message comprising UE capability information of the UE and means for sending a second message comprising information indicative of the UE capabilities.

Embodiments of the present invention advantageously allow to determine when a UE should load the UE capabilities over the radio interface and how the network is updated when the UE capabilities have changed.

It is possible to avoid sending the UE capabilities over the radio interface at every idle to active state transition. Instead only the capability value tag is signaled and if the capability value tag matches the value tag of the UE capabilities previously stored in the network no additional signaling is required.

For certain embodiments of the present invention a changed capabilities flag could be used to signal whether or not the UE capabilities have changed and thereby avoid unnecessary signaling.

Other objects, advantages and novel features of the invention will become apparent from the following detailed description of the invention when considered in conjunction with the accompanying drawings and claims.

BRIEF DESCRIPTION OF THE DRAWINGS

For a better understanding, reference is made to the following drawings and preferred embodiments of the invention.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details.

Those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
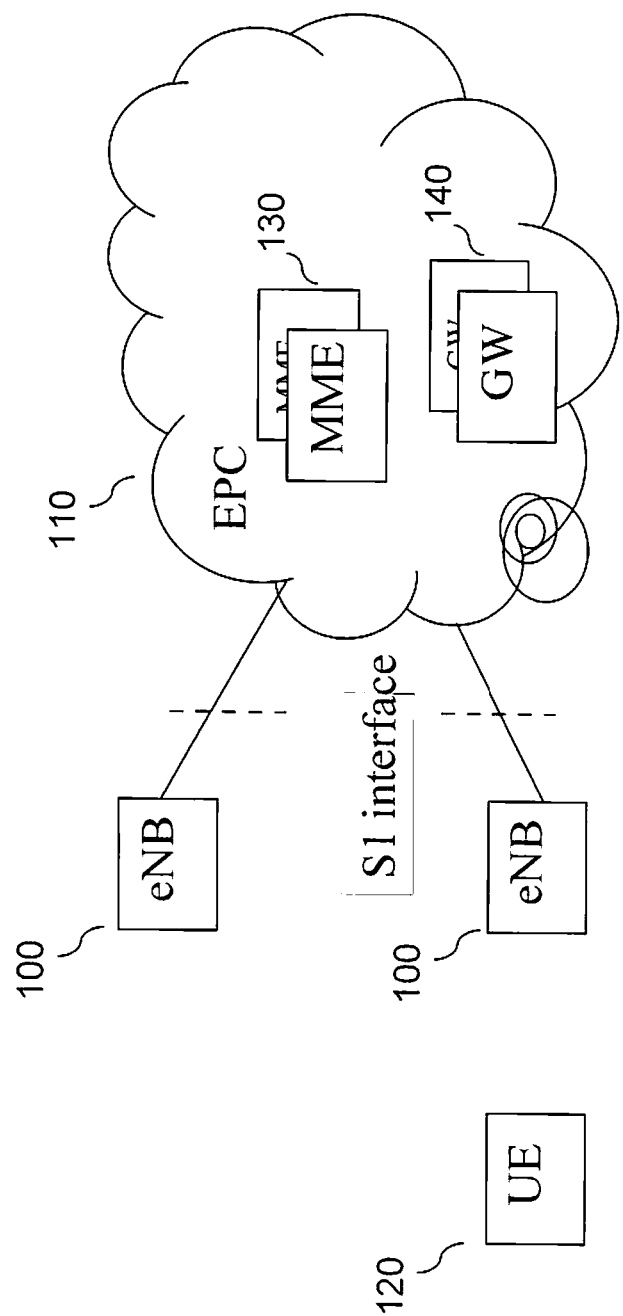
FIG. 1 shows a generic E-UTRAN architecture.

The present invention relates to the management of user equipment (UE) capabilities in a radio access network comprising radio base stations 100 connected to a core network 110 which is illustrated in FIG. 1. The UE 120 communicates wirelessly with one or more of the radio base stations 100. The radio access network may be an LTE (i.e. E-UTRAN) based radio access network. The radio base stations 100, i.e. eNodeBs, are connected to the core network 110, i.e. EPC, using the S1 interface. The EPC comprises a generic control plane entity 130 i.e. the Mobility Management Entity (MME) and a user plane node 140 i.e. the Gateway (GW). In E-UTRAN RRC (Radio Resource Control) signaling is used between the UE and the eNodeB.

A mechanism needs to be in place to maintain the UE capability information in the E-UTRAN and EPC enabling the EPC to tailor transmissions in conjunction with services to the UE according to its capabilities. Further the mechanism has to enable the eNodeB to check whether the UE capability information stored in the EPC is up to date. This is necessary due to the fact that the UE capabilities may change in time, e.g. because certain UE functions are switched on/off by the user of the UE, or because the UE runs out of certain resources such as battery, memory, etc., or because additional input/output devices are connected to it, etc.

Thus, the basic idea of the present invention is to handle the UE capability information in the network wherein an eNodeB 100 receives information regarding the UE capability information from the UE 120 and stores the information. The eNodeB 100 sends the UE capability information to the EPC, i.e. the MME 130. The MME 130 receives and stores the information. The UE 120 sends a message to the eNodeB 100 when it transits from idle to active state, does an initial attach or when a part of the UE capabilities have changed. The eNodeB 100 receives the message and sends it to the MME 130. The MME 130 sends a response associated with the previously stored UE capability information to the eNodeB 100. The eNodeB 100 could decide if the UE capabilities stored in the MME 130 is up-to-date based on the message sent from the UE 120 and the received response from the MME 130. If the UE 120 holds updated UE capabilities the eNodeB 100 could request updated UE capability information from the UE 120.

Although the description of the present invention primarily relates to the handling of the AS capability information; the principles disclosed herein can be readily applied for the management of the NAS part of the UE capabilities as well.

Figure 2:
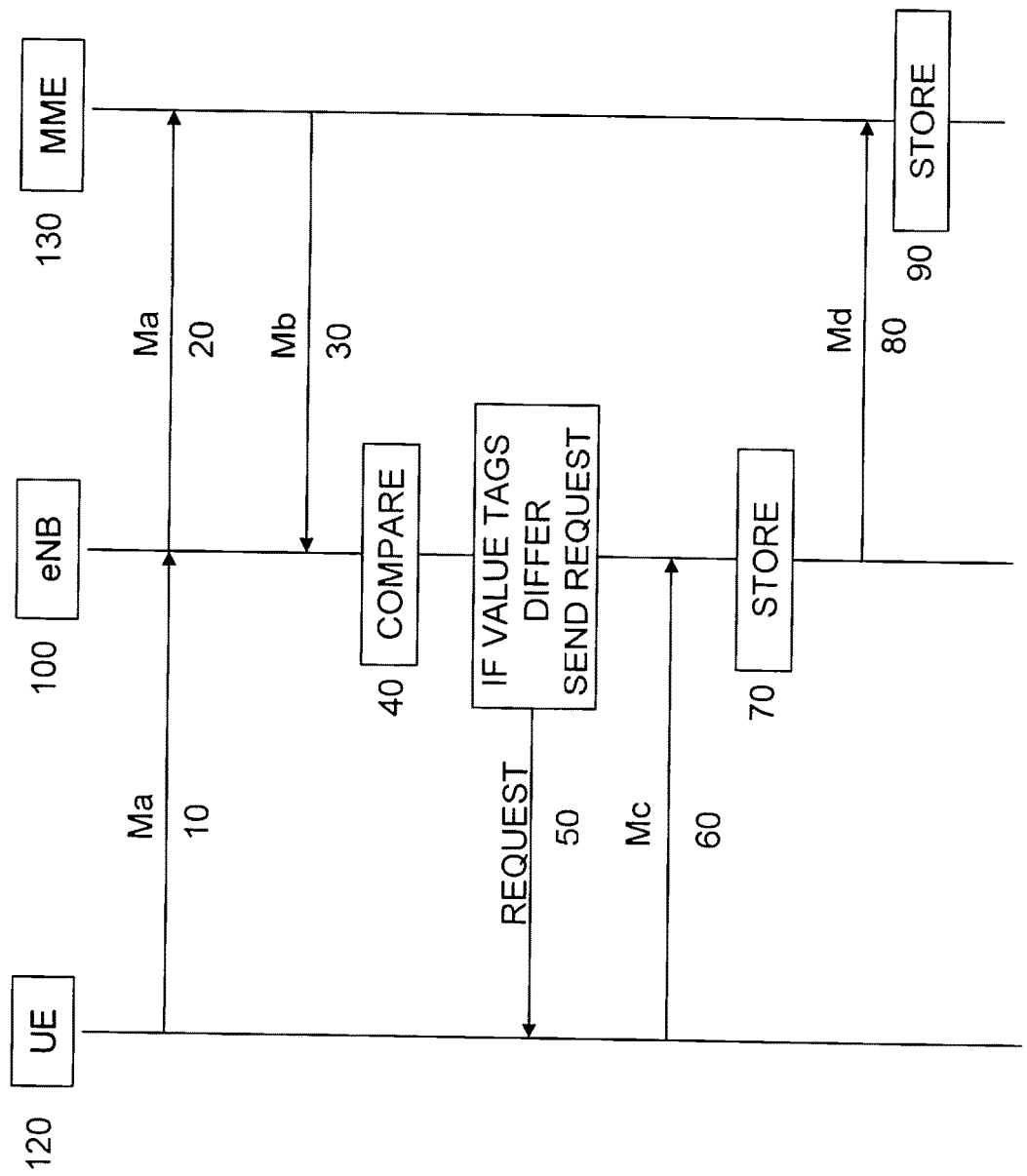
FIG. 2 shows flow charts illustrating a method according to an embodiment of the present invention comprising a value tag.

FIG. 2 shows a flowchart of a method according to an embodiment of the present invention. A UE 120 that intends to connect to the EPC 110 or switch from idle to active state sends 10 an initial AS message Ma to the eNodeB 10. This message Ma comprises information indicative of the current UE capabilities. That is, it could comprise an information element, which signals a value tag of the current UE capabilities that the UE 120 holds. It should be noted that only the value tag, not the actual UE capabilities, is signalled in the message Ma.

In the scenario when the radio access network is an E-UTRAN this means that the RRC signaling message CONNECTION COMPLETE could include an Information Element (IE) defined for this purpose. Likewise this IE could be present in the RRC message used for the reestablishment of the connection after a radio link failure, i.e. in the RRC CONNECTION REESTABLISHMENT COMPLETE message.

The value tag that labels the UE capability information serves as a version number of the information. Each time the UE 120 uploads changed capability information to the EPC 110 an incremented value tag is used. The network stores the corresponding value tag of the UE capability information. The value tag can be, e.g., an integer number, which is incremented after each change of the UE capability information, or a checksum or a hash value calculated from the actual UE capabilities. In an embodiment of the present invention the UE 120 could refer to a previously sent value tag, i.e. an older value tag, and corresponding UE capabilities in the message Ma in case it wants to revert to a previous and already transmitted configuration without resending the whole information on the radio interface at a later stage.

Further, the eNodeB 100 receives 10 the message Ma. The eNodeB 100 sends 20 the message Ma to the MME 130 in the EPC 110. The MME receives 20 the message Ma comprising information indicative of the current UE capabilities of the UE. The MME 130 sends 30 a response to the message Ma to the eNodeB 100. The response includes a message Mb which is associated with the previously stored UE capability information. The message Mb also indicates the value tag of the stored UE capability information. In the scenario when the radio access network is an E-UTRAN this means that the message Mb is a S1 signaling message Initial Context Setup Request.

In the embodiment of the present invention wherein the UE 120 refers to a previously sent value tag, i.e. an older value tag, the message Mb comprises the older value tag and the corresponding stored UE capability information.

The eNodeB 100 receives 30 the message Mb. The eNodeB 100 compares 40 the value tag received in message Mb from the MME 130 with the value tag indicated by the UE 120 in the message Ma. If the value tag indicates outdated information in the MME 130 the eNodeB 100 starts the UE Capability Enquiry procedure and thereby sends 50 a request to the UE 120 for its current UE capabilities. In the scenario when the radio access network is an E-UTRAN this means that the RRC signaling message UE CAPABILITY ENQUIRY is sent to the UE 120.

The UE 120 receives 50 the request and sends 60 a message Mc, comprising the UE capability information of the UE, in response to the request from the eNodeB 100. In E-UTRAN this message Mb would be the UE CAPABILITY INFORMATION message.

In an embodiment of the present invention it is assumed that, during the upload of altered UE capability information 60, the UE 120 uploads the full set of capability information independent of which part of the UE capabilities that has changed. In another embodiment of the present invention only the delta difference compared to the previous UE capability information is uploaded. Thereby the amount of data that needs to be sent on the radio interface between the UE 120 and the eNodeB 100 can be minimized. This embodiment would require that the eNodeB 100 indicates in the request sent 50 to the UE 120, i.e. the UE CAPABILITY ENQUIRY, the value tag of the latest UE capability information in the eNodeB 100. Then the UE 120 uploads only the parts that are changed relative to the version indicated by the value tag in the request from the eNodeB 100.

The eNodeB 100 receives 60 the message Mc and stores 70 the UE capability information. In addition the value tag is stored in eNodeB 100. Further the eNodeB 100 sends 80 a message Md comprising the current UE capability information of the UE to the MME 130. The message Md also comprises the corresponding value tag. In E-UTRAN the message Md is an Initial Context Setup Response message or it could be a dedicated S1 message to be introduced for this purpose. The MME 130 receives 80 the message Md and stores 90 the comprised UE capability information and the corresponding value tag.

Figure 3:
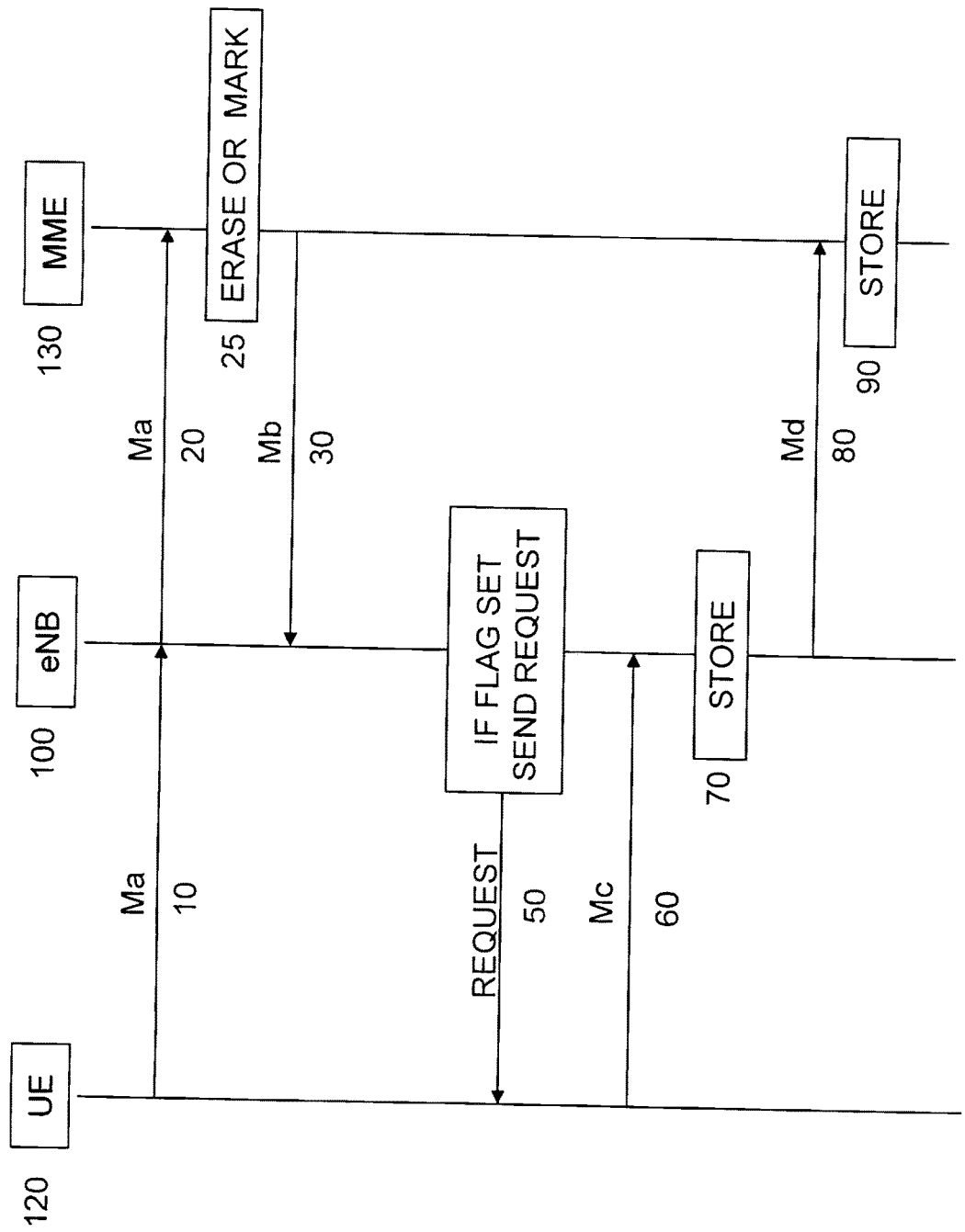
FIG. 3 shows flow charts illustrating a method according to an embodiment of the present invention comprising a changed capabilities flag.

In a further embodiment of the present invention, illustrated in FIG. 3, the message Ma comprises a second information element representing a changed capabilities flag. The flag could be used by the UE 120 to indicate whether the capabilities it currently holds have been uploaded to the eNodeB 100 at an earlier stage or not. That is when the flag is set, one or several of the UE capabilities has been changed since the last upload and when the flag is not set the UE capabilities are the same as they were at the last upload. It should be pointed out that the information elements, i.e. the value tag and the changed capabilities flag, could co-exist but could also be used separately.

Thus, when the eNodeB 100 receives 10 the message Ma, comprising the set changed capabilities flag, it can be sure that the UE capability information previously stored in the MME 130 is outdated even without examining the value tag and waiting for the MME 130 to download the capabilities.

It should be noted that when the eNodeB 100 receives 10 the message Ma and the changed capabilities flag is set in the message Ma the eNodeB 100 may invoke the UE Capability Enquiry procedure even before the message Mb arrives 30 from the MME 130. However, it is recommended that the UE Capability Enquiry procedure is started 50 only after the security has been activated between the eNodeB 100 and the UE 120, since the eNodeB 100 has to wait for the message Mb from the MME 130 in order to obtain the security keys in the message Mb before it can enquire 50 the UE 120 for the UE capability information.

According to a further embodiment of the present invention the eNodeB 100 could indicate to the MME 130 already when sending 20 the message Ma that the changed capabilities flag is set. In E-UTRAN the message Ma could be an Attach Request message. Then the MME can avoid sending outdated information down to the eNodeB and may erase 25 the previously stored UE capability information. As an alternative the stored UE capability information could be marked as outdated. Consequently, the UE capability information in message Mb is set to zero when MME sends 30 the message Mb to the eNodeB 100.

The indication of the value tag and/or the changed capabilities flag can be used also in the RRC message sent by the UE after an IRAT (Inter-Radio Access Technology) handover to LTE, i.e. in the Handover Complete message. This requires that the UE Access Stratum capabilities information related to E-UTRAN and the associated value tag are preserved in the core network also during IRAT handovers. That is, the UE Access Stratum capabilities information related to E-UTRAN are transferred to the target RAT during an LTE to 2G/3G handover and sent back again to E-UTRAN when the UE returns to LTE access. I.e. the UE can move to UTRAN and come back to LTE without being forced to re-upload the UE capabilities.

Figure 4:
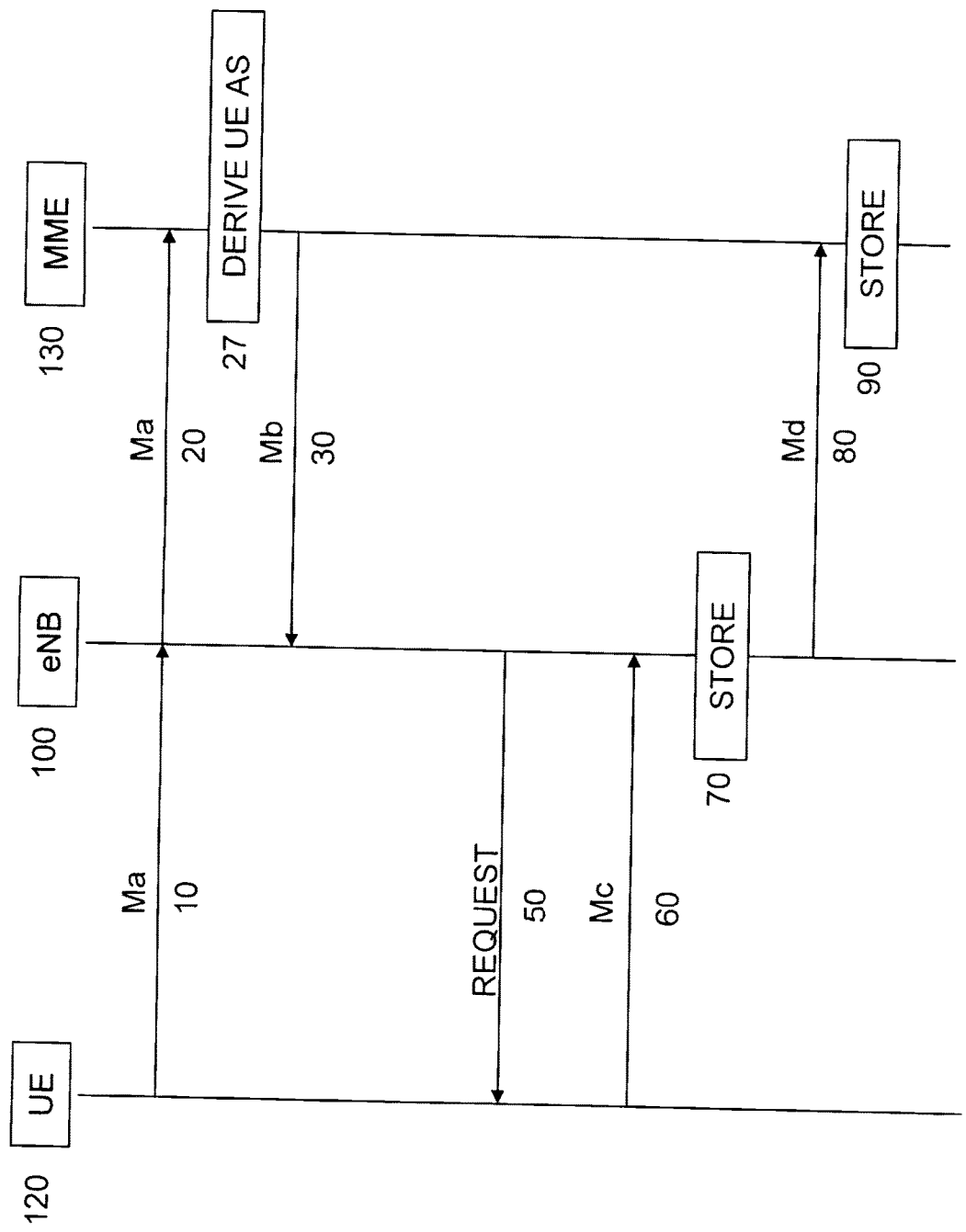
FIG. 4 shows flow charts illustrating a method according to an embodiment of the present invention when the UE performs an initial attach.

In case that there is no UE capability information previously stored in the MME 130, the MME 130 will not be able to send the UE capability information in the message Mb to the eNodeB 100. Thus, the eNodeB 100 receives the message Mb, wherein the UE capability information is set to zero. This is the typical scenario when the UE 120 does an initial attach to the network, as illustrated in FIG. 4. In such a case the lack of UE capability information from the MME 130 will be a trigger for the eNodeB 100 to invoke the UE capability enquiry procedure. Alternatively, it would be possible to set the changed capabilities flag in the message Ma when the UE performs the initial attach, which would be an indication for the eNodeB 100 that it should not expect information from the MME 130, instead it should invoke the UE Capability Enquiry procedure.

Moreover, in the initial attach case an authentication procedure is always associated with the initial attach of the UE 120. A consequence of the authentication of the UE 120 is that the UE security capabilities need to be available in the eNodeB 100 before the authentication can be executed. However, at that stage the general UE Access Stratum capabilities have not yet been uploaded to the MME 130 and, therefore, the initial upload of UE security capabilities has to be handled.

When sending 10 the message Ma, i.e. the initial NAS Attach Request message in E-UTRAN, the UE 120 includes its NAS security capabilities in the message Ma, e.g. the supported NAS ciphering/integrity protection algorithms. The NAS signaling is transparent to the eNodeB 100, i.e. the eNodeB 100 does not interpret the NAS message. When the MME 130 receives the message Ma on S1 i.e. the NAS message, it performs the authentication with the UE 120. During the authentication procedure some information related to the NAS security capabilities of the UE 120 can be echoed back to the UE 120 for confirmation in order to avoid any man-in-the-middle type of attacks where the UE security capabilities sent in the message Ma in clear text are modified and downgraded by an attacker.

The MME 130 derives 350 the AS security capabilities of the UE 120 from the NAS security capabilities of the UE 120 received 20 in message Ma. The MME 130 provides 30 the AS security capabilities of the UE 120 to the eNodeB 100 in the message Mb i.e. the Initial Context Setup Request message in E-UTRAN, along with the ciphering and integrity keys derived during the authentication procedure. The message Mb may include a list of ciphering algorithms supported by the UE 120 according to the derived AS capabilities of the UE 120. The eNodeB 100 selects an appropriate algorithm from the list and activates the security with the UE 120 by sending the SECURITY MODE COMMAND message.

Figure 5:
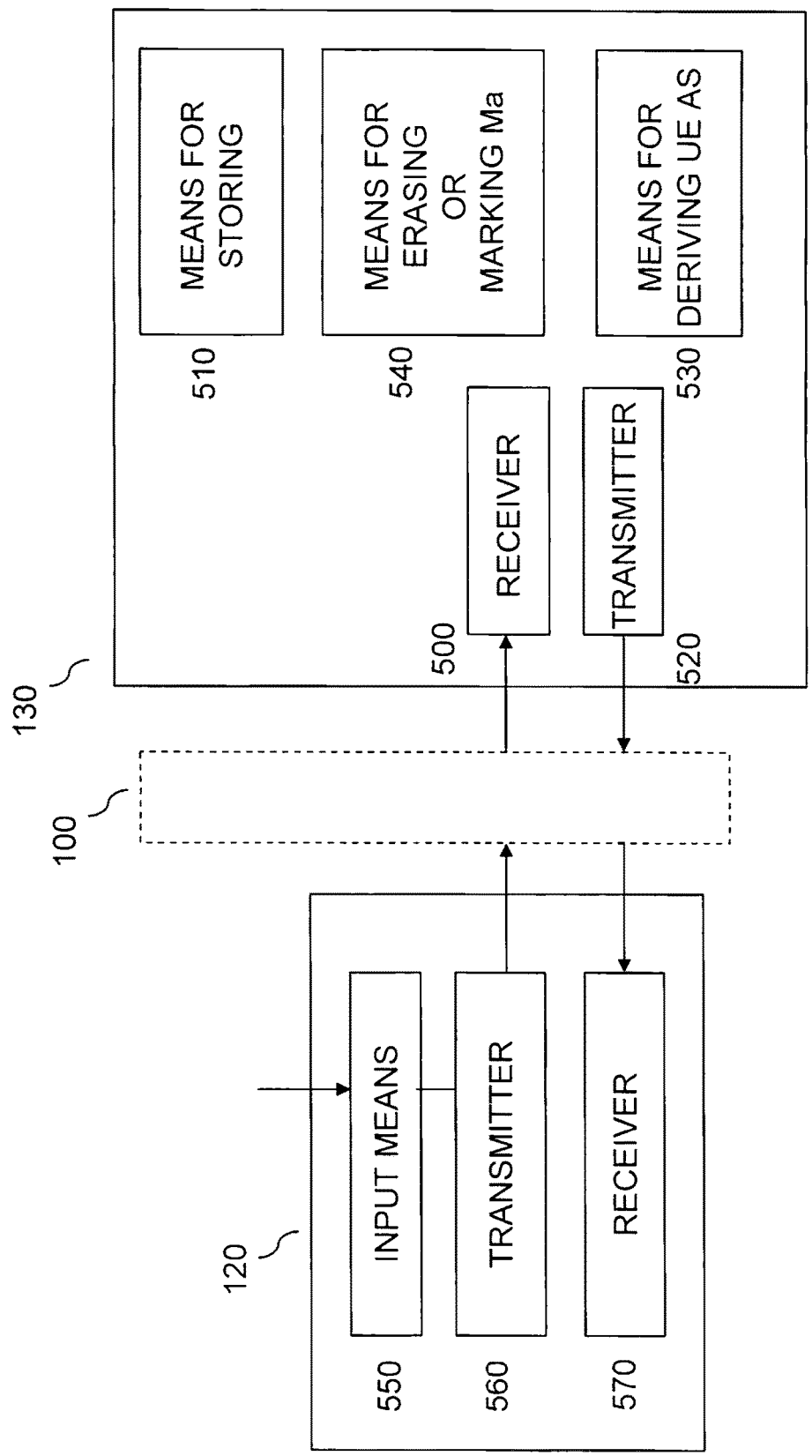
FIG. 5 shows a block diagram schematically illustrating a core network node and a UE in accordance with the present invention.

As shown in FIG. 5 the MME 130 comprises a receiver 500. The receiver 500 is configured to receive the message Md comprising UE capability information of the UE 120 from the eNodeB 100. The MME 130 comprises means for storing 510 the received UE capability information. Further the receiver 500 is configured to receive the message Ma comprising information indicative of the UE capabilities. The MME 130 comprises a transmitter 520, which is configured to send, in response to the message Ma, the message Mb associated with UE capability information to the eNodeB 100.

In an embodiment of the present invention the MME 130 comprises additional means for deriving 530 UE AS security capabilities from the NAS security capabilities and means for erasing 540 the stored UE capability information or mark it as outdated.

As shown in FIG. 5 the UE 120 comprises input means 550 and a transmitter 560. The transmitter 560 is configured to send the message Mc comprising UE capability information of the UE and to send the message Ma comprising information indicative of the UE capabilities to the eNodeB 100.

In an embodiment of the present invention the UE 120 comprises a receiver 570. The receiver 570 is configured to receive a request for the UE capability information from the eNodeB 100.

Figure 6:
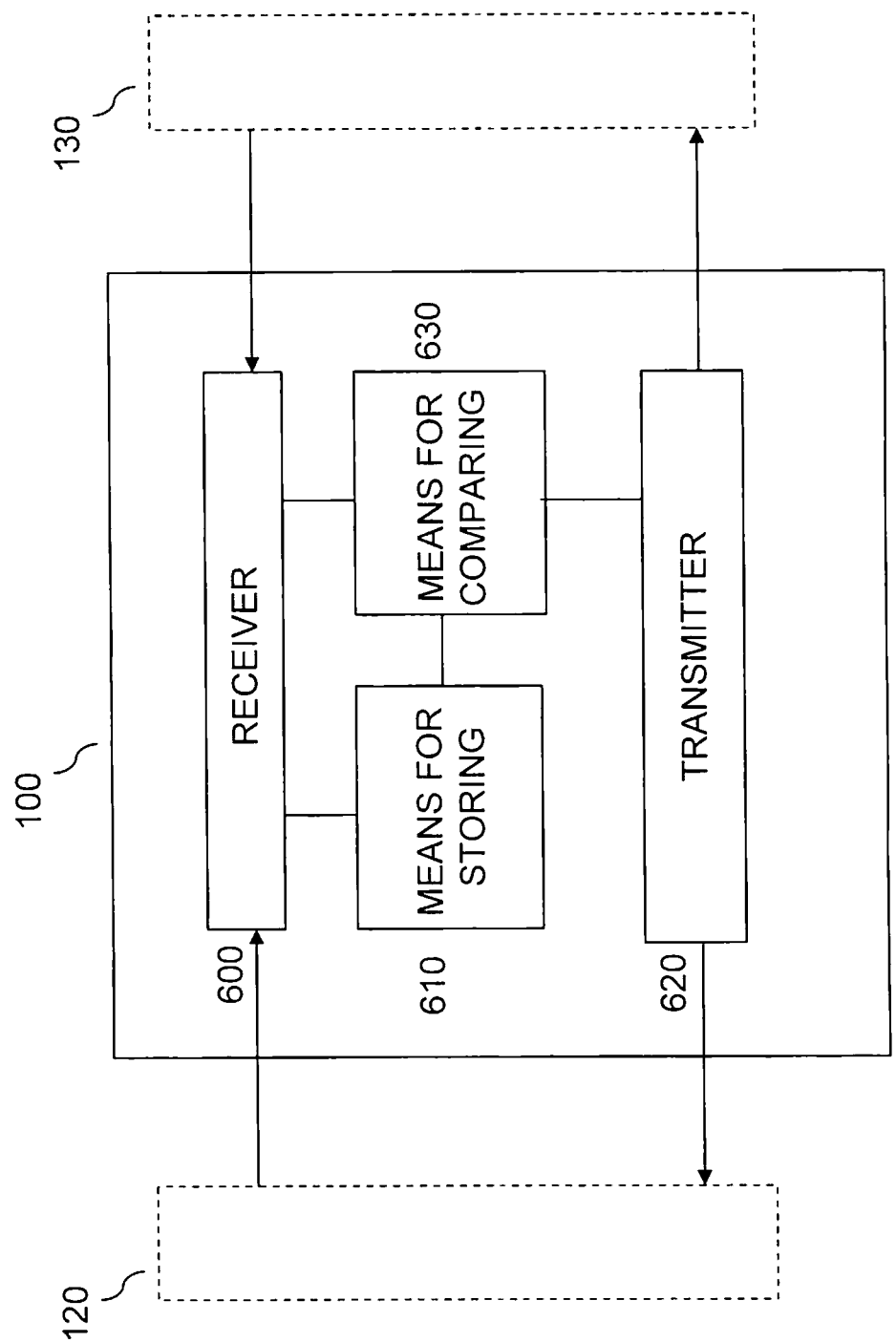
FIG. 6 is a block diagram schematically illustrating an eNodeB in accordance with the present invention.

As shown in FIG. 6 the eNodeB 100 comprises a receiver 600. The receiver 600 is configured to receive the message Mc from the UE 120. The eNodeB 100 also comprises means for storing 610 the received UE capability information. Further the eNodeB 100 comprises a transmitter 620. The transmitter 620 is configured to send the message Md comprising UE capability information of the UE to the MME 130. Further the receiver 600 is configured to receive the message Ma comprising information indicative of the UE capabilities from the UE 120. The transmitter 620 is further configured to send the message Ma indicative of the UE capabilities to the MME 130. The receiver 600 is configured to receive, in response to the message Ma, the message Mb associated with UE capability information from the MME 130.

In an embodiment of the present invention the transmitter 620 is configured to send a request for the UE capability information to the UE 120.

In an embodiment of the present invention the eNodeB 100 comprises means for storing 610 the value tag and additional means for comparing 630 the value tag received from the MME 130 with the value tag received from the UE 120.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

What is claimed is:

1. A method for an eNodeB for handling user equipment (UE) capability information of a UE in a mobile telecommunications network comprising at least one UE associated with UE capabilities and at least one core network node, the method comprising:
   sending a request to the UE for updated UE capability information, in response to a message from the UE comprising information indicative of UE capabilities of the UE, the message comprising a flag that directly indicates that UE capabilities of the UE need to be updated; and
   receiving, from the UE, in response to the request, updated capability information for the UE.

2. The method of claim 1, wherein the message comprises the Non-Access Stratum (NAS) security capabilities of the UE.

3. The method of claim 1, wherein the method further comprises receiving, from the mobile telecommunications network, a setup request for the UE capability information.

4. The method of claim 1, wherein the information indicative of UE capabilities of the UE comprises a value tag corresponding to a current set of UE capabilities for the UE.

5. The method of claim 4, wherein the value tag serves as a version number of the UE capability information.

6. An eNodeB for handling user equipment (UE) capability information of a UE in a mobile telecommunications network that comprises at least one UE holding UE capabilities and at least one core network node, the eNodeB comprising receiver circuitry and transmitter circuitry, wherein the eNodeB is configured to:
    send a request to the UE for updated UE capability information, in response to a message from the UE comprising information indicative of UE capabilities of the UE, the message comprising a flag that directly indicates that UE capabilities of the UE need to be updated; and
    receive, from the UE, in response to the request, updated capability information for the UE.

7. The eNodeB of claim 6, wherein the message comprises the Non-Access Stratum (NAS) security capabilities of the UE.

8. The eNodeB of claim 6, wherein the eNodeB is further configured to receive, from the mobile telecommunications network, a setup request for the UE capability information.

9. The eNodeB of claim 6, wherein the information indicative of UE capabilities of the UE comprises a value tag corresponding to a current set of UE capabilities for the UE.

10. The eNodeB of claim 9, wherein the value tag serves as a version number of the UE capability information.

11. A method for a user equipment (UE) associated with UE capabilities, for handling UE capability information of the UE in a mobile telecommunications network comprising a core network node and a radio base station, the method comprising:
    sending a first message comprising UE capability information of the UE;
    sending a second message comprising information indicative of the UE capabilities, wherein the second message comprises a flag indicating whether the UE capabilities of the UE need to be updated; and
    in the event that the flag is set, receiving a request for the UE capability information from the radio base station.

12. The method of claim 11, wherein the first message is sent to the radio base station.

13. The method of claim 11, wherein the second message is sent to the core network node via the radio base station.

14. The method of claim 11, wherein the second message is sent when the UE intends to switch from idle state to active state.

15. A user equipment (UE) associated with UE capabilities, for handling UE capability information of the UE in a mobile telecommunications network that comprises a core network node and a radio base station, the UE comprising:
    receiver circuitry; and
    transmitter circuitry;
wherein the UE is configured to use the receiver circuitry and transmitter circuitry to:
    send a first message comprising UE capability information of the UE;
    send a second message comprising information indicative of the UE capabilities, wherein the second message comprises a flag that indicates whether the UE capabilities of the UE need to be updated; and,
    in the event that the flag is set, receive a request for the UE capability information from the radio base station.

16. The UE of claim 15, wherein the first message is sent to the radio base station.

17. The UE of claim 15, wherein the second message is sent to the core network node via the radio base station.

18. The UE of claim 15, wherein the second message is sent when the UE intends to switch from idle state to active state.

\* \* \* \* \*

UNITED STATES PATENT AND TRADEMARK OFFICE
CERTIFICATE OF CORRECTION

| | |
|---|---|
| PATENT NO. | : 11,632,670 B2 |
| APPLICATION NO. | : 17/225620 |
| DATED | : April 18, 2023 |
| INVENTOR(S) | : Mildh et al. |

It is certified that error appears in the above-identified patent and that said Letters Patent is hereby corrected as shown below:

In the Specification

In Column 1, Lines 22-23, delete "Evolved Packet Core network (EPC)." and insert -- Evolved Packet Core (EPC) network. --, therefor.

In Column 2, Line 57, delete "core network mode" and insert -- core network node --, therefor.

Signed and Sealed this
Thirtieth Day of July, 2024

Katherine Kelly Vidal
*Director of the United States Patent and Trademark Office*